UNITED STATES PATENT OFFICE.

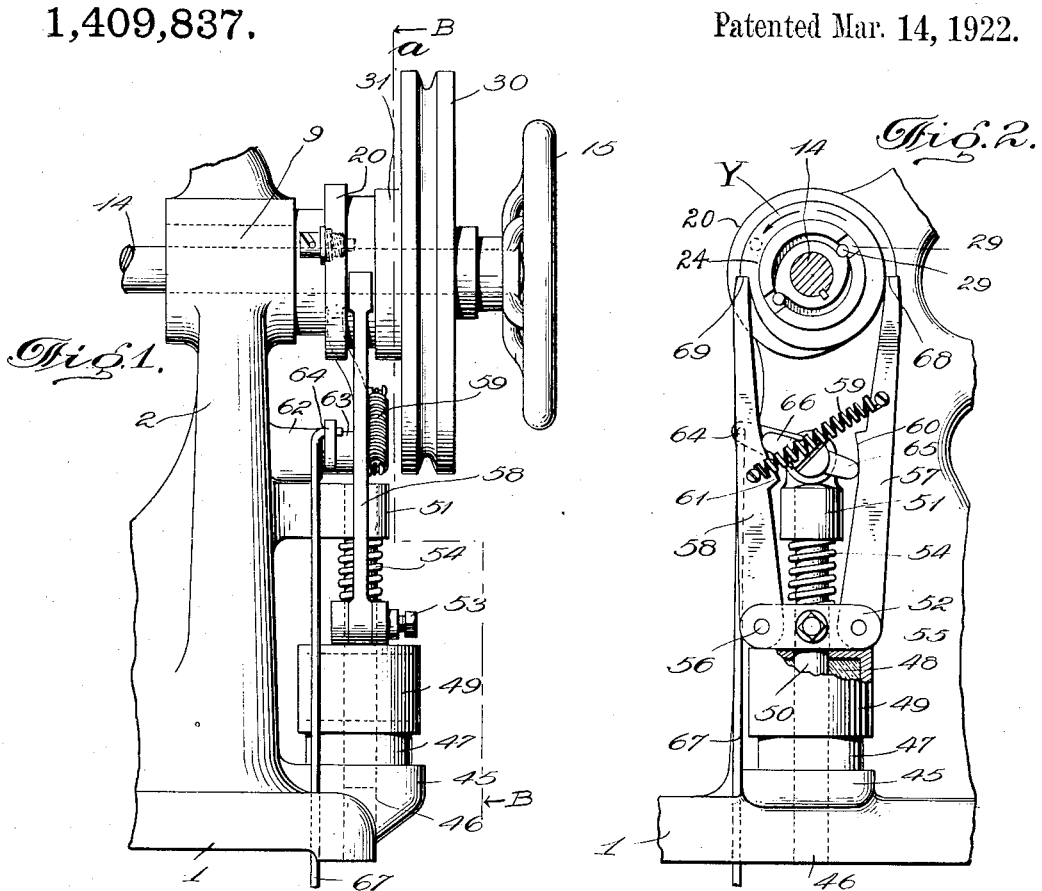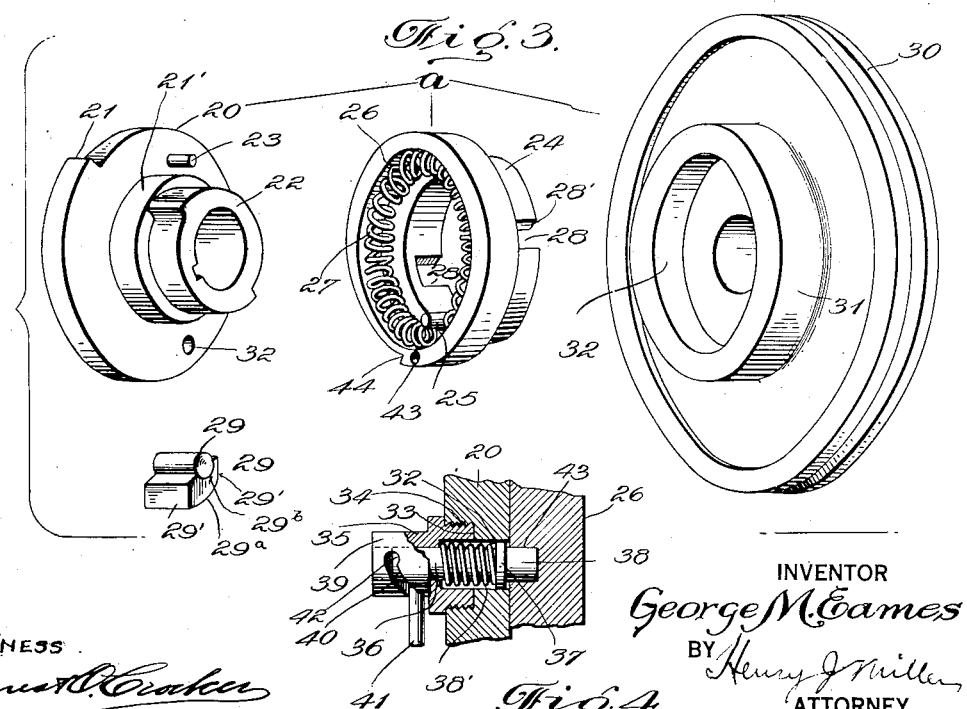

GEORGE M. EAMES, OF BRIDGEPORT, CONNECTICUT, ASSIGNOR TO THE SINGER MANUFACTURING COMPANY, A CORPORATION OF NEW JERSEY.

CLUTCH AND STOP MECHANISM.

1,409,837.   Specification of Letters Patent.   Patented Mar. 14, 1922.

Application filed October 31, 1917. Serial No. 199,486.

*To all whom it may concern:*

Be it known that I, GEORGE M. EAMES, a citizen of the United States, residing at Bridgeport, in the county of Fairfield and State of Connecticut, have invented certain new and useful Improvements in Clutch and Stop Mechanisms, of which the following is a specification, reference being had therein to the accompanying drawings.

This invention relates to clutch and stop mechanism for controlling the rotation of a driven shaft, and while herein illustrated as applied to a machine for setting fasteners such for example as eyelets, it is manifest that the device is in nowise restricted to use with such machines but is equally applicable wherever it is found desirable to stop a driven shaft at a fixed point in its rotation, starting and stopping thereof recurring at frequent intervals of varying duration.

An object of the present invention is to provide in connection with a driving clutch, means for positively stopping and locking the driven shaft at a fixed point in the cycle of operation of the parts moved thereby and without undue shock and strain upon the adjacent parts of the mechanism.

Another object of the invention is to provide a clutch comprising driving and stop elements, and of a character which will permit the disengagement of both the driving and stop elements, leaving the driven shaft stopped but free to turn, and with the drive pulley still running, such an arrangement being very desirable in certain types of machine for permitting adjustment of the operating parts.

Other and additional objects and advantages of the invention, together with important details of construction and improved combinations of parts will be hereinafter more particularly described and claimed.

These and other features of the invention will be better understood and appreciated from the following description of a preferred embodiment thereof selected for purposes of illustration and shown in the accompanying drawing, in which:—

Fig. 1 is a front elevation of the mechanism as applied to the main drive shaft of a fastener setting machine, Fig. 2 is a sectional, end elevation taken on the line B—B of Fig. 1, and showing the clutch elements in neutral position, Fig. 3 is a detail view of the clutch elements disassembled, And Fig. 4 is a sectional detail of the locking device for the clutch elements.

1 indicates the base of the machine to which the improved stop mechanism is applied, and 2 is a bracket rising from the base 1, said bracket being provided with a bearing 9 for the main drive shaft of the machine. The main drive shaft is indicated at 14 and is shown as provided upon its right hand end with the usual hand-wheel 15 fixed thereto. Located upon the drive shaft between the hand-wheel and the bearing 9 is a drive mechanism including a clutch indicated generally by reference letter $a$. The clutch mechanism may be of any suitable type but is here shown as of the form known as the Horton clutch, an example of which may be seen in patent to Horton, 260,394, July 4, 1882.

The clutch herein disclosed comprises a collar 20 fixed upon the shaft said collar being provided with a stop-lug or shoulder 21, a bearing boss 21', a double cam-member 22 and an out-standing pin 23. Cooperating with said collar is a clutch-ring 24 rotatably mounted upon the boss 21' and provided with an out-standing pin 25. This clutch-ring 24 is provided with a flange 26 providing in connection with boss 21' a recess for a spring 27 said spring bearing at its opposite ends upon the respective pins 23 and 25. Pins 23 and 25 may be at different radial distances from the center of the supporting shaft and by this arrangement the spring can be readily inserted within the receiving cavity of the clutch-ring 24 with one end bearing upon the pin 25, and the clutch-ring 24 may thereafter be mounted upon the collar 20 with the pin 23 of the latter freely passing the pin 25 to engage the other end of the spring, this arrangement, however, not being essential.

The clutch-ring 24 is provided with a pair of slots 28 forming receptacles for the clutching devices 29 shown as blocks freely slidable therein. These blocks each comprise a substantially rectangular base portion having parallel bearing surfaces 29' adapted to slide within the guiding walls 28' of slots 28,—a curved surface 29ª acting as the clutch element, and a semi-cylindrical bearing or seat 29ᵇ for a cylindrical roller 20'' the latter engaging the surface of cam-member 22. 30 indicates a drive pulley having a hollow boss 31, the latter providing a clutching surface 32 for engagement with the curved surfaces of clutch-blocks 29 when the latter are thrown into clutching relation, the pulley being loosely mounted on the drive shaft between the hand wheel 15 and collar 20, and having its boss so positioned as to enclose the portion of clutch ring 24 containing slots 28.

32 indicates an opening formed in the collar 20, said opening being shouldered at 33 and being screw-threaded at 34. Engaging the screw-threads at 34 is the threaded portion of a flanged bushing 35. Slidably mounted within the said bushing and extending through the opening 32 is a coupling pin 36 said pin being provided with a flange 37 and with a portion 38 projecting beyond said flange. Seated within the cavity formed between the bushing 35 and the flange 37 and within the opening 32 is a spring 38', said spring acting normally to press the pin 36 in a direction away from the bushing thereby to project the end 38 of the pin beyond the face of the collar 20. Mounted upon said bushing 35 or integral therewith is a hollow, cylindrical extension 39, said extension being provided with an inclined slot 40.

Fixed in the outer end of the pin 36 is a handle member 41 projecting outwardly through the slot 40. It is evident from inspection of the construction shown that rotary movement of the handle member 41 about the axis of the pin 36 will cause an outward movement of the pin 36 against the tension of the spring 38' by reason of the engagement of the pin 41 with the inclined walls of the slot 40. The slot is provided at its end with an enlargement 42 serving as a seat for holding the handle in fixed position when the latter is brought into engagement with said enlargement. Cooperating with the extending end 38 of the pin 36 is an opening 43 in the flange 26 of the clutch-ring 24. The clutch-ring 24 is further provided with a stop shoulder or lug 44, said lug when the parts are assembled, facing in a direction opposite to that of the lug 21.

Upon the base of the machine directly below the location of the clutch member is an outstanding lug 45 said lug having an opening 46 extending therethrough. Fixedly mounted upon said lug or integral therewith is a block 47 forming a base or support and upon this base or support is located a relatively thick annular washer of resilient material 48, this washer serving as a buffer member. It is clearly evident, however, that other equivalent means may be substituted for said washer. 49 represents a cap or cover adapted to slidably engage the outer surface of the block 47, forming a cap for the same through an opening in the top of the cover 49 is a rod 50 said rod being guided at its upper end in a bearing opening in a second bracket 51 fixed to the frame of the machine.

Suitably mounted upon the rod 50 is a yoke member 52, this member being shown as adjustably fixed upon the rod by a set-screw 53. Located between the bracket 51 and the yoke 52 is a coiled spring 54 this spring serving to constantly keep yoke 52 in engagement with the top of the cover member 49. Pivotally mounted upon the ends of the yoke member at the points 55 and 56 respectively are a pair of stop-arms 57 and 58, said stop-arms being normally moved toward each other at their upper ends by a spring 59 attached at its opposite ends to the respective arms. Arms 57 and 58 are provided near their central portions with oppositely inclined cam-members 60 and 61 respectively. Pivotally supported upon an upper extension 62 of the bracket 51 is a rocker-member 63 provided with an outwardly extending arm 64 and with a pair of oppositely extending cam engaging arms, 65, 66 said arms being adapted to engage the cam surfaces 60 and 61 respectively.

Connected to the end of the arm 64 is any suitable device adapted for control by the operator, herein shown as a rod 67 adapted for connection to a suitable treadle. The stop-arms 58 and 57 are provided at their free extremities with stop surfaces 69 and 68 adapted for engagement with the stop-lugs 44 and 21 of the clutch-ring 24 and the collar 20. The operation of this clutch mechanism will now be obvious.

In the drawings (Figs. 1 and 2) the machine is shown as at rest, the stop arms being in engagement with the stop lugs of the clutch device, clutch-blocks 29 being shown in neutral position. At this time the spring 27 is under compression tending to turn the clutch member 24 with respect to the collar 20 but is restrained from such movement by the engagement of the stop devices. Upon movement of the lever 64 the arms 65 and 66 engage the respective cam surfaces 60 and 61 of the stop arms thereby separating the free extremities of the stop arms and thus disengaging them from the stop lugs. At the instant of release of the lug 44 from its stop arm 58 the spring 27 expands thereby causing a partial rotation of the clutch-ring 24 in the direction of the arrow Y (Fig. 2). This movement causes the clutch blocks 29 to ride up upon the cam surfaces of the cam-member 22 and thereby clutches the continuously rotating pulley 30 to the drive-shaft permitting a positive drive of the same.

Upon release of the treadle or other means another and into the path of the stop lugs 21 and 44. Upon engagement of the lug 44 with its stop arm the ring 24 is stopped and the cam 22 rides out from beneath the clutch-blocks 29 thereby releasing the driving shaft, the momentum of the machine putting the spring 27 under tension. At the instant of release of the drive shaft the stop-arm 57 goes beneath the lug 21 and thereby prevents reverse rotation of the shaft. It will be noted that by reason of the inter-position of the buffer member 48 between the stop-arms and the frame of the machine the shock due to sudden stoppage of the parts is to a large extent absorbed, thereby avoiding undesirable strain in the machine parts.

During the normal operation of the machine the pin 36 is in retracted position the handle 41 being located in the enlargement 42 of the slot 40 thus providing for independent movement of the collar 20 and the clutch-ring 24. It is at times desirable to turn the drive shaft by hand while the driving pulley is still running, but it is evident that in the series of operations above described this is impossible for as soon as the stopping devices are thrown out of action the drive-pulley is clutched to the shaft for driving the same and upon stopping the machine the drive-shaft is positively locked against manual operation. The purpose of the pin 36 is to permit of such manual control of the drive-shaft with the machine stopped.

Upon release of the pin 36 by manipulation of the handle 41, the machine being stopped, the spring 38 projects said pin to such a position as to cause its end 38 to engage the opening 43 in the clutch-ring 24 thus positively locking the ring and collar together. It will now be evident that with the pin 36 thus released and coupling the parts together, the stop arms may be retracted from the stop lugs without any operation of the clutch elements, the clutch-ring 24 being restrained from turning movement under action of the spring 27 by reason of the locking engagement of the pin 36. The drive shaft is now unlocked from the stopping devices and also disconnected from the drive pulley and may thus be turned freely by hand for adjusting the various mechanical parts or for any other desired purpose, it being evident that by this operation the drive shaft may be turned by hand without the necessity of turning a countershaft or other driving connections.

Whereas in clutches of this type as heretofore known wherein a stop-arm is employed, a large unbalanced force has been developed which must all be absorbed by the machine frame, in this device the arrangement of the stop and reverse arm upon the same support and upon opposite sides of the shaft, together with the manner of mounting the support serves to balance the thrust developed in stopping, thus relieving the adjacent frame parts of undesirable strain to a very large extent.

Having thus indicated the nature of the invention and the mode of operation thereof,—I claim as new and desire to secure by Letters Patent of the United States:—

1. In a clutch of the Horton type, a pair of stop arms adapted respectively to unclutch the driven parts and to stop reverse rotation thereof, and common means for cushioning the shock imparted to said arms by the unclutching and stopping actions respectively thereof.

2. In a mechanism of the class described, a driving member, a shaft driven thereby, a clutch mechanism adapted to establish and interrupt driving relation between them, controlling means for said clutch mechanism, recoil-arresting means for preventing retrograde motion of said shaft, and means for shifting said controlling and recoil-arresting means to ineffective positions.

3. In a mechanism of the class described, a drive and a driven member, a clutch mechanism to clutch and unclutch said members, a member arranged to receive a thrust from said clutch mechanism in stopping the driven member, a member arranged to receive thrust from the recoil of said driven member, and common buffer means to cushion the shock on both said thrust members.

4. In a clutch and stop mechanism of the Horton type comprising a collar fixed upon the shaft and a rotatable clutch element, said collar and clutch element being provided with oppositely directed stop shoulders, a pair of movable stop arms adapted to engage the respective shoulders, means tending to throw said stop arms into engaging relation with said shoulders and means under control of the operator for disengaging said arms from said shoulders.

5. In a clutch of the Horton type, a stop member comprising a swinging arm, resilient means constantly tending to throw said arm into stopping position, said arm being provided with a cam face, and a device under control of the operator and adapted to act on said cam face to swing said arm out of stopping position.

6. In a clutch of the Horton type comprising a collar fixed to the shaft and a clutch member rotatable thereon said collar and clutch member being provided with oppositely facing stop shoulders, a pair of pivotally mounted stop arms provided with cam surfaces, resilient means tending to throw said arms into engaging position with the respective shoulders, and a single device, cooperating with said cam surfaces, under control of the operator, for simultaneously swinging said arms out of engagement with the shoulders.

7. In a clutch of the Horton type, a pair of stop-arms adapted respectively to stop rotation of the driven parts and stop reversal thereof, and buffer means coacting with said arms to absorb the shock of stopping.

8. In a clutch of the Horton type, in combination, a stop shoulder, a second shoulder to stop reverse movement of the driven parts, a pair of stop arms adapted to engage the respective shoulders, a supporting member for said arms, and means for guiding and for resiliently positioning said member, whereby the shock of stopping is transmitted from said arms to said resilient supporting means.

9. In a clutch of the Horton type comprising a pair of stop arms adapted respectively to stop rotation of the driven parts and to prevent reversal thereof, a pair of guiding brackets having bearing openings therein arranged in alignment, a supporting member slidable in said openings and provided with pivot means for said arms, a resilient buffer between said pivot means and one of said brackets and resilient positioning means between said pivotal means and the other bracket.

10. In a clutch of the Horton type having a movable stop arm, a slidable support, a yoke fixed to said support and carrying said stop arm, a bearing for the support, a buffer for said support comprising a base surrounding said bearing, an annular, resilient member on said base and surrounding said support, and a cap slidable upon said base and resting upon the resilient member and sustaining said yoke.

11. In a stop clutch of the Horton type, in combination, a shoulder acting as a stop element, a second shoulder acting to stop reversal of the parts, instrumentalities adapted to engage the respective shoulders and buffer means interposed between said instrumentalities and the machine frame and adapted to absorb the shock of stopping.

12. In a clutch of the Horton type comprising a collar fixed to the shaft and a clutch member rotatable thereon, said collar and clutch member being provided with oppositely facing stop shoulders, the combination of a pair of pivotally mounted stop arms, resilient means tending to throw said arms into engaging position with the respective shoulders, and means for simultaneously moving said arms out of their respective engaging positions.

13. In a clutch of the Horton type comprising a collar fixed to the shaft and a clutch member rotatable thereon, said collar and clutch member being provided with oppositely facing stop shoulders, the combination of a pair of stop elements, resilient means tending to throw said elements into engaging position with the respective shoulders, and means for simultaneously moving said elements out of their respective engaging positions, one of said elements being movable at certain times independently of said moving means.

In testimony whereof, I have signed my name to this specification.

GEORGE M. EAMES.